Aug. 14, 1934.    H. M. FLANARY    1,969,887
ANTIGLARE DEVICE FOR AUTOMOBILES
Filed Jan. 18, 1932
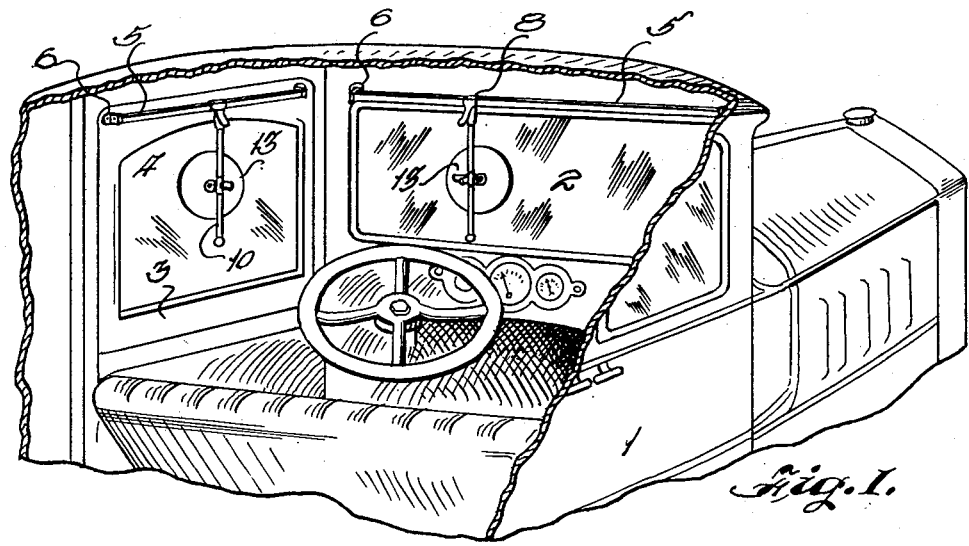
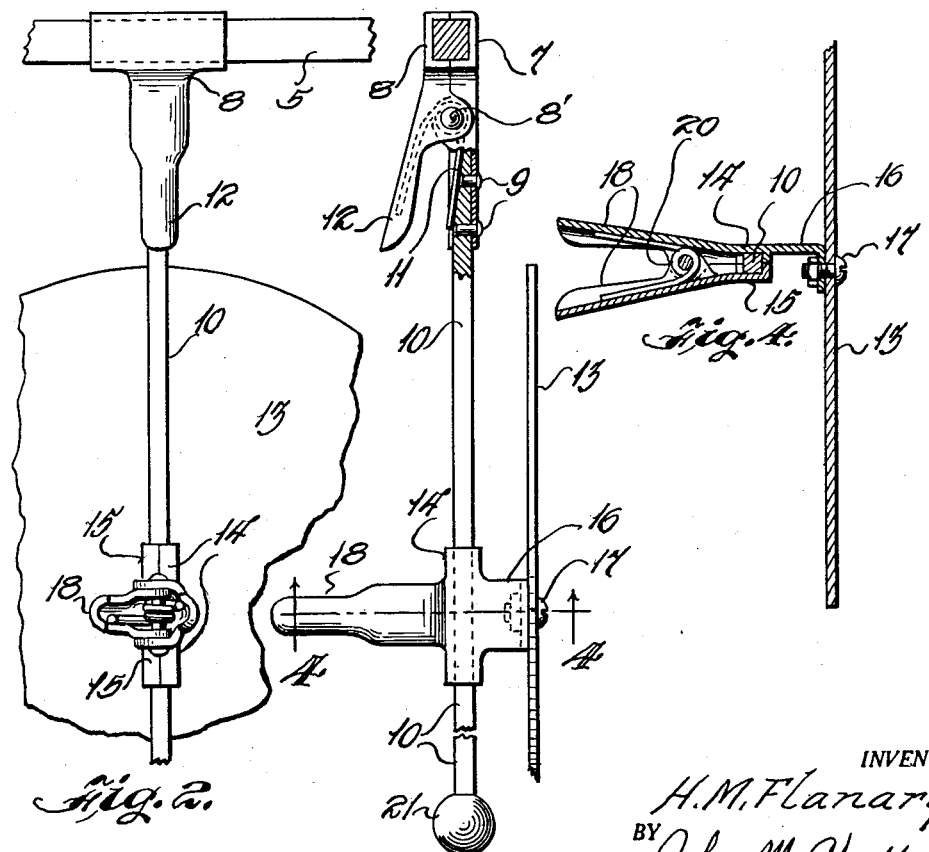
INVENTOR.
H. M. Flanary,
BY John M. Spellman
ATTORNEY.

Patented Aug. 14, 1934

1,969,887

UNITED STATES PATENT OFFICE 1,969,887

ANTIGLARE DEVICE FOR AUTOMOBILES

Howard M. Flanary, Dallas, Tex.

Application January 18, 1932, Serial No. 587,348

1 Claim. (Cl. 296—97)

This invention relates to improvements in devices for preventing the glare of the sun or of any other light from blinding or interfering with the vision of a driver of an automobile, and in such connection it relates further to a device designed to lessen accidents and make driving of an automobile safer and more pleasurable.

Another object of the invention is to provide a device of this character which is very simple in construction and equally so of operation and which remains in place on the vehicle always ready for instant use.

With the above objects in view the invention will be easily understood from a perusal of the following detailed description, taken in connection with the accompanying drawing and wherein:

Figure 1 is a broken-away partial perspective view of an automobile and illustrating an embodiment of the invention both on the vehicle frame adjacent the windshield and on the frame next the door.

Figure 2 is an enlarged fragmentary view of the supporting rods and the disk or "sunspot".

Figure 3 is a side elevational view or edgewise view of the device removed from the operating position on the automobile, and Figure 4 is a cross-sectional view of Figure 3, the view taken on the line 4—4 thereof.

Proceeding in accordance with the drawing, 1 denotes a vehicle body with windshield 2, door 3 with its glass 4.

The device comprises a bar of steel as shown at 5, provided with hanging members 6 riveted to the bar for the purpose of rigidly and securely fastening the bar to the automobile frame just above the windshield 2 and if preferred also just above the glass 4 of the door 3. The bar may be square or otherwise.

Removably and slidably arranged on the bar 5 is a steel clamp including the jaws 7 and 8, the jaw 7 being riveted at 9 to a second and similar square or otherwise shaped bar 10. The other jaw 8 is pivoted at 8' to the jaw 7 and a spring 11 holds the two jaws in clamped position on the square bar 5. These jaws as will be apparent are so shaped that they conformably grip the bar 5 and prevent oscillation, yet the spring 11 permits of ready loosening of the jaws by means of the lower extension or thumb rest 12. Obviously loosening of these jaws permits slidable adjustment of the bar 10 with respect to the bar 5, in moving the disk 13 to proper position. The lower portion of the bar 10 is likewise slidably arranged in the jaws 14 and 15 of a similar clamp, one part of this clamp including an extension 16 which is bolted at 17 to the disk 13. The jaws of the latter clamp are more elongated than those of 7 and 8 to provide more gripping surface. A spring 20 holds the jaws 14 and 15 in gripping relation with the bar 10, which tension may be loosened by compressing the thumb and finger rests or handles 18 in moving the disk to position vertically. A ball 21 prevents the clamp from being moved past the lower end of the bar 10.

The disk 13 is made of a non-light-reflecting metal and when moved to proper position within the line of vision of the driver or other occupants of the car will prevent the sun or other bright and glaring light from blinding the eyes without obstructing the view. This will be understood because the eyes will not be focused on the disk but on the road and hence the disk will not be noticed but will break the sun's glare. The disk can be easily shifted horizontally or vertically by means of the clamps and will remain in such position. It will be found that quite often the driver or occupant will only need to shift the head slightly without moving the disk, to get the desired result.

The invention is capable of some modification such as would be within the scope of the appended claim.

What is claimed as new is:

An anti-glare device of the class described comprising a bar substantially square in cross section and secured to an automobile adjacent a glass enclosed opening, a clamp adapted to slide horizontally on said bar, said clamp having L-shaped gripping jaws under spring pressure, a second substantially square bar rigidly secured to said clamp, an enlarged end on said second bar, a second clamp with L-shaped gripping jaws, said second clamp adapted to slide vertically on said second bar, and a non-light reflecting member carried by the said second clamp.

HOWARD M. FLANARY.